United States Patent
Moshenrose

(10) Patent No.: US 7,241,330 B2
(45) Date of Patent: Jul. 10, 2007

(54) AIR CLEANER ELECTROSTATIC PRECIPITATOR CELL

(75) Inventor: Paul A. Moshenrose, Ocean Springs, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 279 days.

(21) Appl. No.: 10/972,799

(22) Filed: Oct. 25, 2004

(65) Prior Publication Data

US 2006/0086250 A1    Apr. 27, 2006

(51) Int. Cl.
B03C 3/47    (2006.01)

(52) U.S. Cl. .................................. 96/83; 95/57; 96/87

(58) Field of Classification Search .............. 96/83–87; 95/57

See application file for complete search history.

(56) References Cited

U.S. PATENT DOCUMENTS

| | | | | | |
|---|---|---|---|---|---|
| 2,470,356 | A | * | 5/1949 | MacKenzie | 96/87 |
| 2,542,262 | A | * | 2/1951 | Richardson | 96/86 |
| 2,642,952 | A | * | 6/1953 | Landgraf | 96/86 |
| 2,714,939 | A | * | 8/1955 | Richardson | 96/86 |
| 3,017,952 | A | | 1/1962 | Westlin | 96/86 |
| 3,017,953 | A | | 1/1962 | Rivers | 96/86 |
| 3,018,846 | A | * | 1/1962 | Czerwonka et al. | 96/86 |
| 3,114,616 | A | | 12/1963 | Palmore | 96/86 |
| 3,175,341 | A | * | 3/1965 | Winter | 96/86 |
| 4,253,852 | A | | 3/1981 | Adams | 96/58 |
| 4,326,861 | A | | 4/1982 | Matsumoto | 96/32 |
| 4,473,382 | A | | 9/1984 | Cheslock | 96/58 |
| 4,516,991 | A | | 5/1985 | Kawashima | 96/55 |
| 5,035,728 | A | | 7/1991 | Fang | 96/19 |
| 5,100,439 | A | * | 3/1992 | Kemp | 96/86 |
| 5,248,324 | A | * | 9/1993 | Hara | 96/37 |
| 5,433,772 | A | * | 7/1995 | Sikora | 96/87 |
| 6,096,119 | A | * | 8/2000 | Ho et al. | 96/79 |
| 6,163,098 | A | | 12/2000 | Taylor et al. | 310/308 |
| 6,176,977 | B1 | | 1/2001 | Taylor et al. | 204/176 |
| 6,312,507 | B1 | | 11/2001 | Taylor et al. | 96/19 |
| 6,350,417 | B1 | | 2/2002 | Lau et al. | 422/186.04 |
| 6,413,302 | B1 | | 7/2002 | Harrison et al. | 96/63 |
| 6,544,485 | B1 | | 4/2003 | Taylor | 422/186.04 |
| 6,632,407 | B1 | | 10/2003 | Lau et al. | 422/186 |
| 6,709,484 | B2 | | 3/2004 | Lau et al. | 95/76 |
| 6,713,026 | B2 | | 3/2004 | Taylor et al. | 422/186.04 |
| 6,958,089 | B1 | * | 10/2005 | Huang | 96/79 |
| 2002/0141914 | A1 | | 10/2002 | Lau et al. | 422/186.07 |
| 2003/0170150 | A1 | | 9/2003 | Lau et al. | 422/186 |
| 2003/0196887 | A1 | | 10/2003 | Lau et al. | 204/164 |
| 2003/0209420 | A1 | | 11/2003 | Taylor et al. | 204/164 |
| 2005/0160908 | A1 | * | 7/2005 | Kukla | 96/83 |

* cited by examiner

FOREIGN PATENT DOCUMENTS

GB    1202930    8/1970
JP    4-322757 A  * 11/1992    96/87

*Primary Examiner*—Richard L. Chiesa
(74) *Attorney, Agent, or Firm*—The Ollila Law Group LLC

(57) ABSTRACT

An electrostatic precipitator cell is provided according to an embodiment of the invention. The electrostatic precipitator cell includes a connection rod including first and second ends, a length, a cross-sectional shape, and a lengthwise surface. The electrostatic precipitator cell further includes collection plates located in spaced-apart arrangement on the connection rod. A collection plate includes at least one aperture. The central aperture substantially conforms to the cross-sectional shape of the connection rod. The electrostatic precipitator cell further includes an attachment device (s) for removably attaching the collection plates to the connection rod. The collection plates are held in a substantially parallel orientation on the connection rod by the attachment device(s).

32 Claims, 9 Drawing Sheets

AIR CLEANER ELECTROSTATIC PRECIPITATOR CELL

TECHNICAL FIELD

The present invention relates to an air cleaner, and more particularly, to an electrostatic precipitator cell for an air cleaner.

BACKGROUND OF THE INVENTION

Air cleaners and purifiers are widely used for removing foreign substances from air. The foreign substances can include pollen, dander, smoke, pollutants, dust, etc. In addition, an air cleaner can be used to circulate room air. An air cleaner can be used in many settings, including at home, in offices, etc.

One type of air cleaner is an electrostatic precipitator. An electrostatic precipitator operates by creating an electrical field. Dirt and debris in the air becomes ionized when it is brought into the electrical field by an airflow. Charged positive and negative electrodes in the electrostatic precipitator air cleaner, such as positive and negative plates, create the electrical field and one of the electrode polarities attracts the ionized dirt and debris. Because the electrostatic precipitator comprises electrodes or plates through which airflow can easily and quickly pass, only a low amount of energy is required to provide airflow through the electrostatic precipitator. As a result, foreign objects in the air can be efficiently and effectively removed without the need for a mechanical filter element. Periodically, the electrostatic precipitator can be removed and cleaned.

In the prior art, a typical electrostatic precipitator cell is mass produced. The prior art electrostatic precipitator cell includes multiple plates and is typically formed out of stamped sheet metal. The plates are commonly welded or crimped together to form some manner of fixed structure. As a result, the prior art electrostatic precipitator cell is specially designed for a particular implementation, including the number of plates, the plate spacing and voltage requirements, the overall physical size and shape, etc.

The prior art has several drawbacks. The prior art electrostatic element is not designed as a device comprising modular units. The prior art electrostatic element is formed of permanently attached components. A welding or crimping manufacturing method results in a prior art electrostatic precipitator cell that cannot be tailored to various applications. In addition, the welding operation can cause warping of electrode plates. The prior art electrostatic precipitator cell cannot be constructed with varying numbers of plates. The prior art electrostatic precipitator cell cannot be easily assembled. The prior art electrostatic precipitator cell cannot be disassembled for cleaning, repair, or refurbishment. In addition, the prior art has had difficulty in eliminating ionization zones caused by sharp edges in the prior art electrostatic precipitator cell.

SUMMARY OF THE INVENTION

An electrostatic precipitator cell is provided according to an embodiment of the invention. The electrostatic precipitator cell comprises a connection rod including first and second ends, a length, a cross-sectional shape, and a lengthwise surface. The electrostatic precipitator cell further comprises a plurality of collection plates located in spaced-apart arrangement on the connection rod. A collection plate of the plurality of collection plates includes at least one aperture. The aperture substantially conforms to the cross-sectional shape of the connection rod. The electrostatic precipitator cell further comprises attachment means for removably attaching the plurality of collection plates to the connection rod. The plurality of collection plates are held in a substantially parallel orientation on the connection rod by the attachment means.

An electrostatic precipitator cell is provided according to an embodiment of the invention. The electrostatic precipitator cell comprises a connection rod including first and second ends, a length, a cross-sectional shape, and a lengthwise surface. The connection rod includes a plurality of spaced-apart circumferential grooves formed in the lengthwise surface of the connection rod. The electrostatic precipitator cell further comprises a plurality of collection plates. A collection plate of the plurality of collection plates comprises a substantially planar plate including a predetermined thickness and at least one aperture, with the aperture substantially conforming to the cross-sectional shape of the connection rod. The collection plate includes one or more spring members formed adjacent to the aperture so that when the collection plate is assembled to the connection rod the one or more spring members engage a groove of the plurality of spaced-apart circumferential grooves when the connection rod is rotated with respect to the plurality of collection plates. The groove locates and removably retains the collection plate on the connection rod. The plurality of collection plates are held in a substantially parallel orientation in the plurality of grooves of the connection rod.

A method of forming an electrostatic precipitator cell is provided according to an embodiment of the invention. The method comprises providing a plurality of collection plates including a corresponding plurality of apertures. An aperture substantially conforms to the cross-sectional shape of the connection rod. The method further comprises inserting a connection rod into the plurality of apertures and engaging one or more attachment devices between the connection rod and a collection plate. The one or more attachment devices removably attach the collection plate to the connection rod, wherein the plurality of collection plates are removably attached to the connection rod in a spaced-apart, substantially parallel relation.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1–11 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
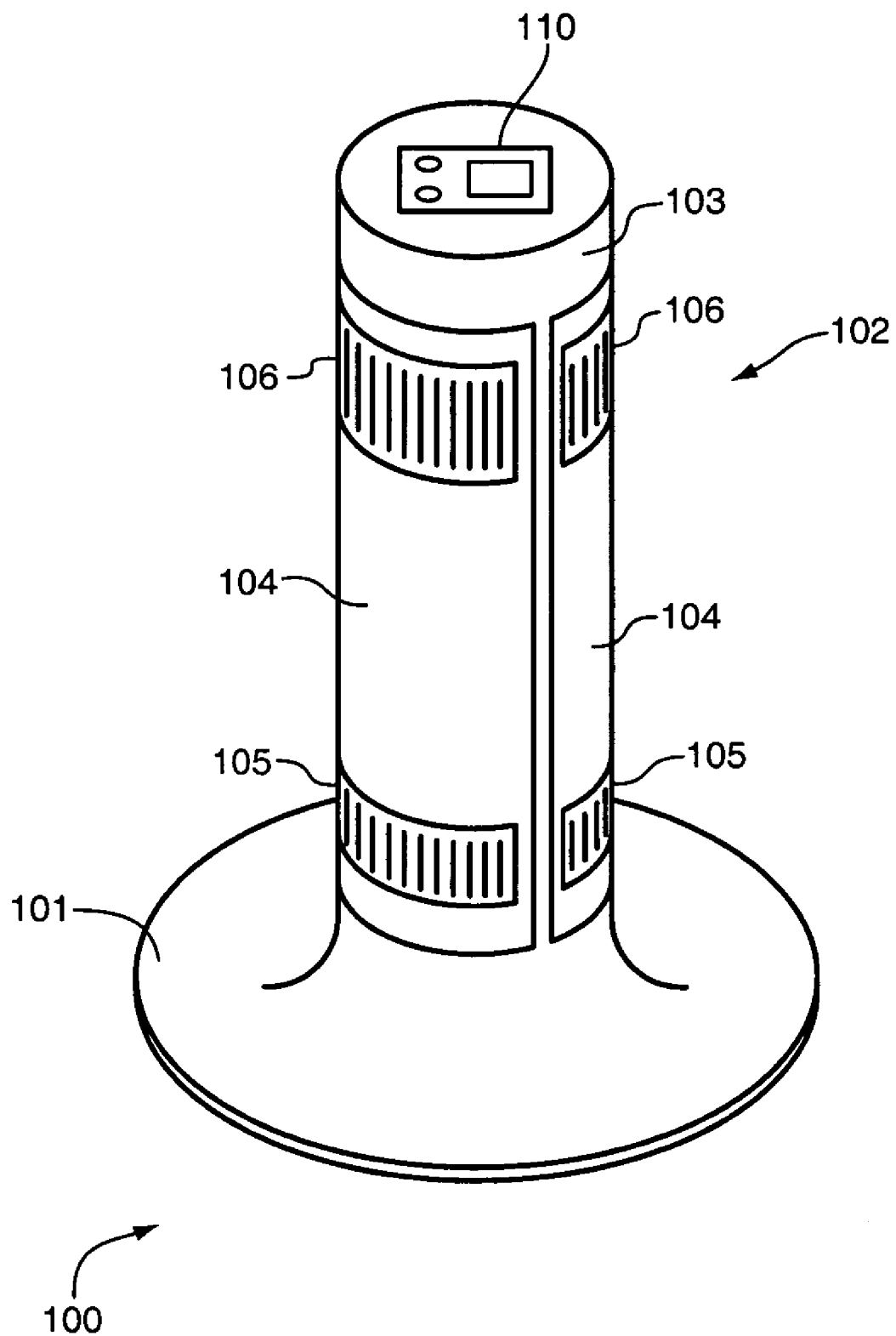
FIG. 1 shows a tower air cleaner according to an embodiment of the invention.

FIG. 1 shows an air cleaner 100 according to an embodiment of the invention. The air cleaner 100 in the embodiment shown comprises a tower air cleaner, but it should be understood that the air cleaner 100 can be constructed in any shape or orientation, including a vertical air cleaner, a horizontal air cleaner, a table-top air cleaner, etc. The air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 106, is cleaned inside the tower portion 102, and the cleaned air is exhausted from the air outlet 106.

The air inlet 105 is shown as being at the lower end of the tower portion 102. However, it should be understood that alternatively the relative positions of the air inlet 105 and the air outlet 106 could be interchanged.

Figure 2:
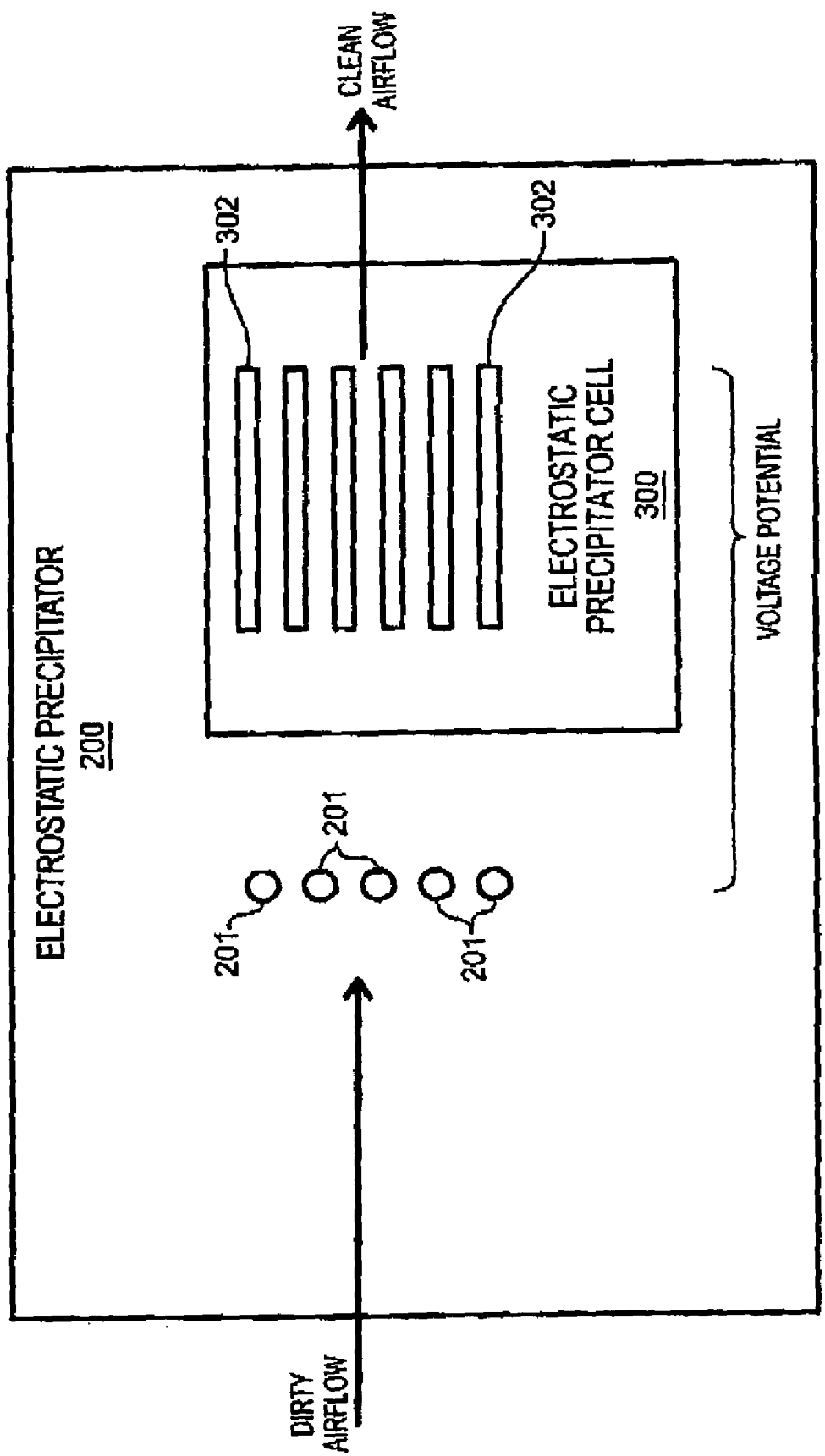
FIG. 2 shows a typical electrostatic precipitator and constituent components.

FIG. 2 shows a typical electrostatic precipitator 200 and constituent components. The electrostatic precipitator 200 includes an electrostatic precipitator cell 300 and one or more electrodes 201. The electrostatic precipitator cell 300 comprises one or more collection plates 302. In operation, a voltage is placed on the electrodes 201. A ground potential (or an opposite voltage potential) can be placed on the collection plates 302. In one embodiment, a positive voltage potential is placed on the electrodes 201 and a negative or ground voltage potential is placed on the collection plates 302. However, it should be understood that the voltage field can be reversed. As a result, there is a voltage potential between the electrodes 201 and the collection plates 302. In addition, a voltage potential can be placed across adjacent plates of the electrostatic precipitator cell 300. Therefore, air traveling through the electrostatic precipitator 200 from left to right is ionized by the voltage potential as the airflow passes through the region of the electrodes 201. As a consequence, dirt and debris entrained in the airflow is charged (typically a positive charge) and the charged dirt and debris is attracted to the collection plates 302. The airflow, now without the dirt and debris, is exhausted from the electrostatic precipitator 200 in a substantially cleaned condition.

Figure 3:
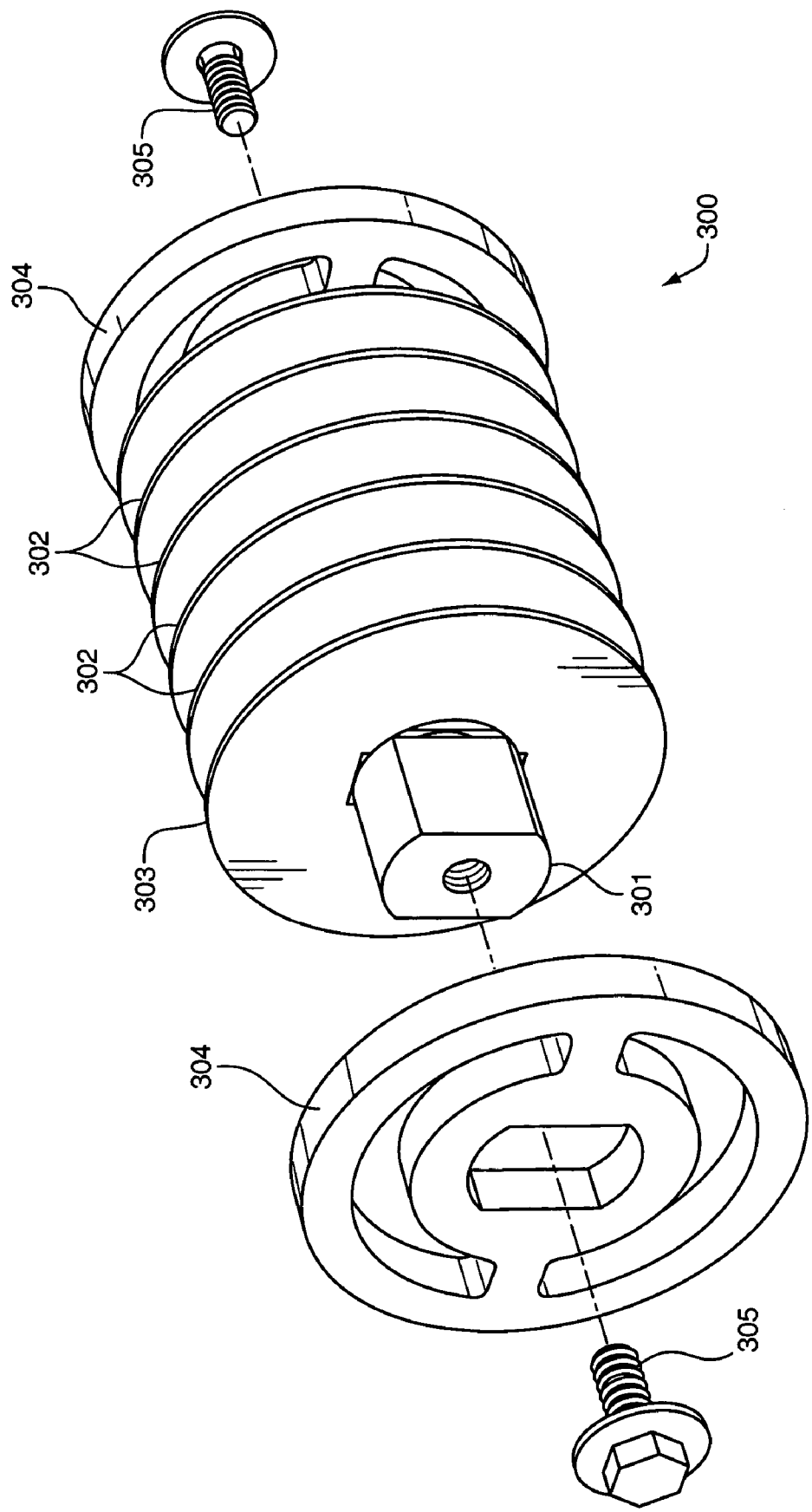
FIG. 3 shows a portion of an electrostatic precipitator cell according to an embodiment of the invention.

FIG. 3 shows a portion of the electrostatic precipitator cell 300 according to an embodiment of the invention. The electrostatic precipitator cell 300 includes a connection rod 301, collection plates 302, end plates 303, end caps 304, and fasteners 305. The electrostatic precipitator cell 300 can comprise a component of the air cleaner 100.

When assembled, the collection plates 302 are assembled onto and locked onto the connection rod 301. Consequently, the collection plates 302 are removably attached to the connection rod 301. The connection rod 301 therefore can comprise the sole support for the electrostatic precipitator cell 300, wherein the first and second ends 401 and 402 of the connection rod 301 are used to support and hold the electrostatic precipitator cell 300 in some manner of frame or air cleaner device. Alternatively, the electrostatic precipitator cell 300 can include a plurality of collection plates 302, and a plurality of connection rods 301 can be used to support the collection plates 302.

A voltage potential can be placed on the electrostatic precipitator cell 300 via the connection rod or rods 301, for example. In one embodiment, one or both of the first and second ends 401 and 402 of a connection rod 301 can engage some manner of electrical contact. Alternatively, in another embodiment some manner of conductor (not shown) can be attached to the connection rod 301 by the fasteners 305.

Multiple collection plates 302 can be included in the assembled electrostatic precipitator cell 300. The electrostatic precipitator cell 300 can have any number of plates, such as 10–30 plates, for example. In one embodiment, where only a subset of the grooves 405 are being used, then the individual collection plates 302 are separated by empty grooves 405. Advantageously, the number of collection plates 302 can be easily varied during assembly of the electrostatic precipitator cell 300. In this manner, the configuration of the electrostatic precipitator cell 300 can be designed for the particular application.

The collection plates 302 are in between end plates 303 and end caps 304. The end plates 303 can comprise collection plates with additional features (see FIG. 8 and the accompanying discussion). The end caps 304 are removably attached to the connection rod 301 by the fasteners 305. The completed assembly forms the electrostatic precipitator cell 300. The electrostatic precipitator cell 300 can comprise all or part of the collection plates of an electrostatic precipitator 200. An electrical potential can be placed across the electrostatic precipitator cell 300 and one or more electrodes 201 in order to electrostatically ionize the air and therefore remove dirt and debris from the air by electrostatically attracting the dirt and debris to the electrostatic precipitator cell 300.

Figure 4:
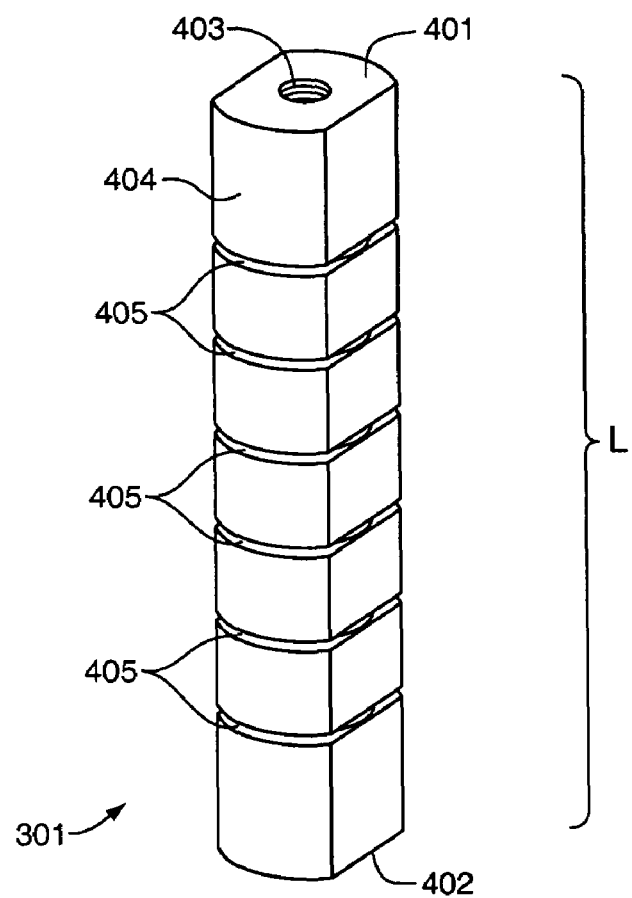
FIG. 4 shows a connection rod according to an embodiment of the invention.

FIG. 4 shows a connection rod 301 according to an embodiment of the invention. The connection rod 301 includes a first end 401, a second end 402, first and second fastener apertures 403, a length L, a lengthwise surface 404, and multiple spaced-apart circumferential grooves 405. The circumferential grooves 405 can be spaced across the length L, including being substantially equally spaced across the length L.

In one embodiment, the lengthwise surface 404 comprises at least one substantially curved lengthwise portion and at least one substantially planar lengthwise portion. In another embodiment, the lengthwise surface 404 comprises two substantially curved lengthwise portions and two substantially lengthwise planar portions. For example, the lengthwise surface 404 can comprise a substantially cylindrical connection rod 301 that includes one or two flat portions. However, it should be understood that the connection rod 301 can be formed of any shape, including various surface cut-outs, channels, and/or faces (see FIGS. 11A–11F and the accompanying discussion).

The circumferential grooves 405 are used to hold individual collection plates 302. The circumferential grooves 405 can comprise semi-circular grooves, rectangular grooves, etc. The circumferential grooves 405 are formed into the lengthwise surface 404 of the connection rod 301. The circumferential grooves 405 can engage one or more spring members of the collection plates 302 (see FIGS. 5 and 6 and the accompanying discussion).

In one embodiment, the first and second fastener apertures 403 comprise threaded apertures 403 and the fasteners 305 comprise threaded fasteners 305. As a result, the threaded fasteners 305 in this embodiment can be screwed in to the first and second threaded fastener apertures 403 in order to retain the plates and end caps on the connection rod 301.

Figure 5:
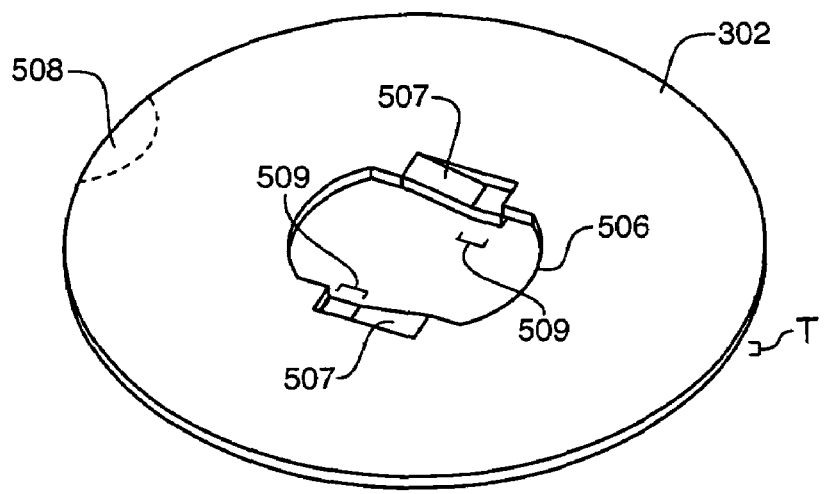
FIG. 5 shows a collection plate according to an embodiment of the invention

FIG. 5 shows a collection plate 302 according to an embodiment of the invention. The collection plate 302 comprises a substantially planar plate with a thickness T, and in the embodiment shown has a substantially circular shape. However, it should be noted that other shapes can be employed, including ovoid, rectangular, irregular, etc. The thickness T can be any desired thickness. The collection plate 302 includes an aperture 506 and one or more spring members 507. The aperture 506 in one embodiment can comprise a substantially central aperture 506.

The aperture 506 corresponds to the cross-sectional shape of the connection rod 301 and therefore can comprise various corresponding shapes. In one embodiment, the central aperture 506 is substantially circular, with two flat sides (see FIGS. 3 and 4 and the accompanying discussion).

Each collection plate 302 can include one or more attachment devices 507. In one embodiment, the one or more attachment devices 507 comprise one or more spring members 507. The spring members 507 engage the circumferential grooves 405 of the connection rod 301. Alternatively, the attachment devices 507 can comprise non-conducting spacers 507, such as o-rings or rubber o-rings that snap into the grooves 405, elastomeric or deformable washers or spacers, etc.

A spring member 507 can comprise a stamped out portion of the collection plate 302, wherein a tab portion 509 of the spring member 507 is substantially parallel to and displaced away from the collection plate 302. In addition, the spring member 507 is formed of a resilient material, wherein the tab portion 509 can be forced substantially into a planar alignment with the rest of the collection plate 302 when the spring member 507 is engaged in a circumferential groove 405 of the connection rod 301. In one embodiment, the entire collection plate 302 is formed of a resilient material, wherein the spring member 507 is stamped into the collection plate 302.

The collection plate 302 can optionally include one or more alignment features 508 (see dashed line). The one or more alignment features 508 can be used to align the collection plates 302 for assembly. The one or more alignment features 508 can comprise any manner of notch, tooth, projection, indentation, etc. For example, the one or more alignment features 508 can engage some manner of assembly fixture or assembly jig in order to ensure that all collection plates 302 of an electrostatic precipitator cell 300 are substantially aligned. The alignment can be performed before insertion of the connection rod 301.

Figure 6:
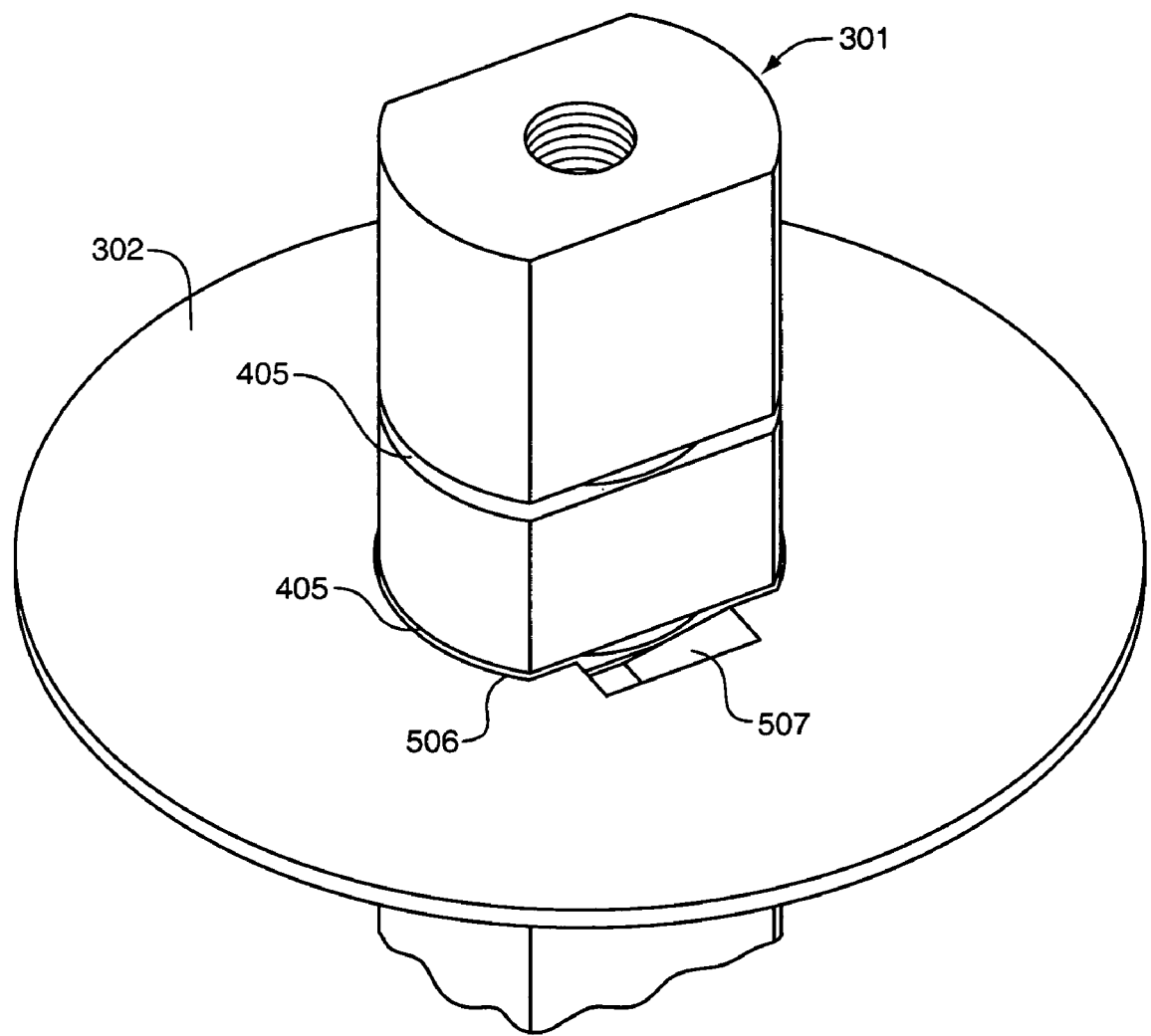
FIG. 6 shows the connection rod inserted into the collection plate.

FIG. 6 shows the connection rod 301 inserted into the collection plate 302. In this figure, a spring member 507 is aligned with a circumferential groove 405 but is not engaged in the circumferential groove 405. The cross-sectional shape of the connection rod 301 is aligned with and corresponds to the aperture 506 of the collection plate 302.

Figure 7:
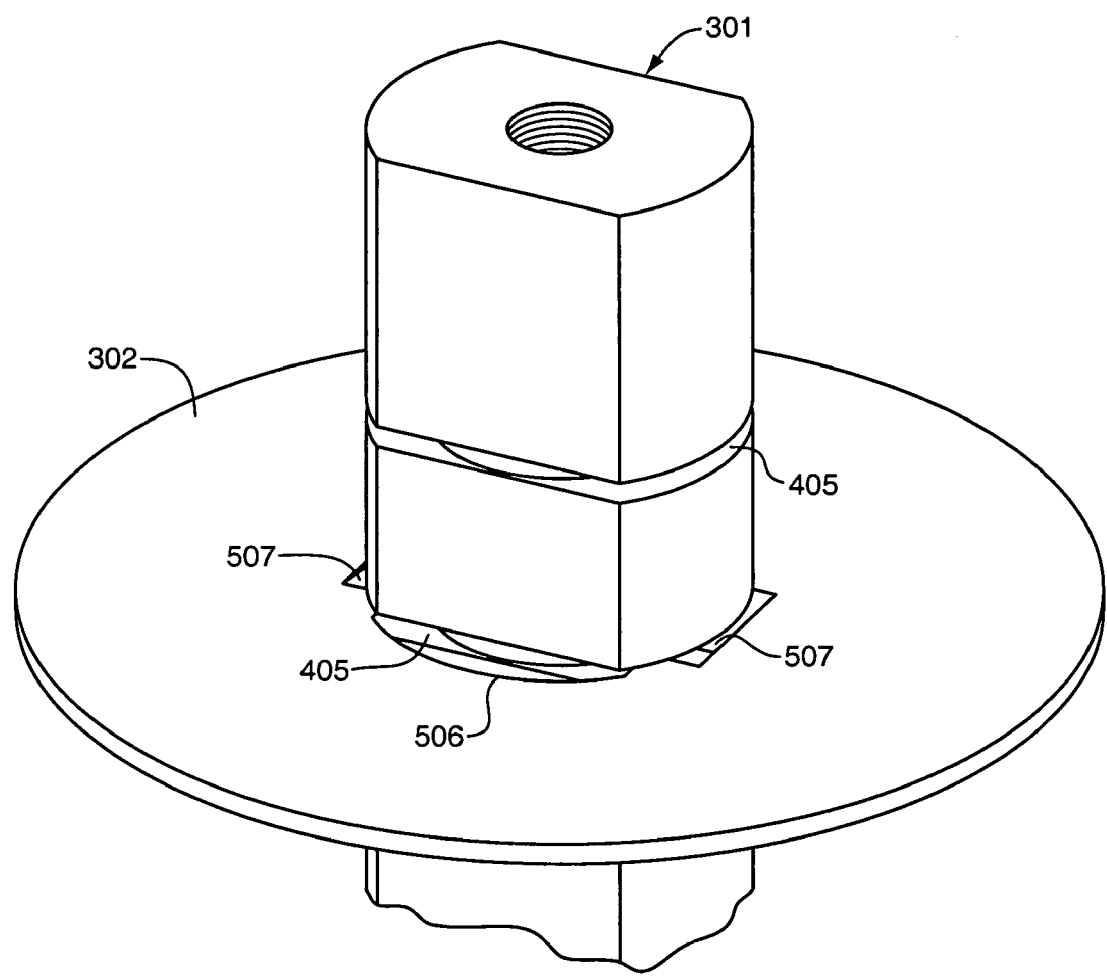
FIG. 7 shows the connection rod after the connection rod has been rotated into a cross-alignment in a central aperture of a collection plate.

FIG. 7 shows the connection rod 301 after the connection rod 301 has been rotated into a cross-alignment in the aperture 506 of the collection plate 302. Here, the spring members 507 have engaged the circumferential groove 405, and therefore are at least partially deformed back into alignment with the collection plate 302. In this manner, the one or more spring members 507 exert a retaining force on the collection plate 302.

Figure 8:
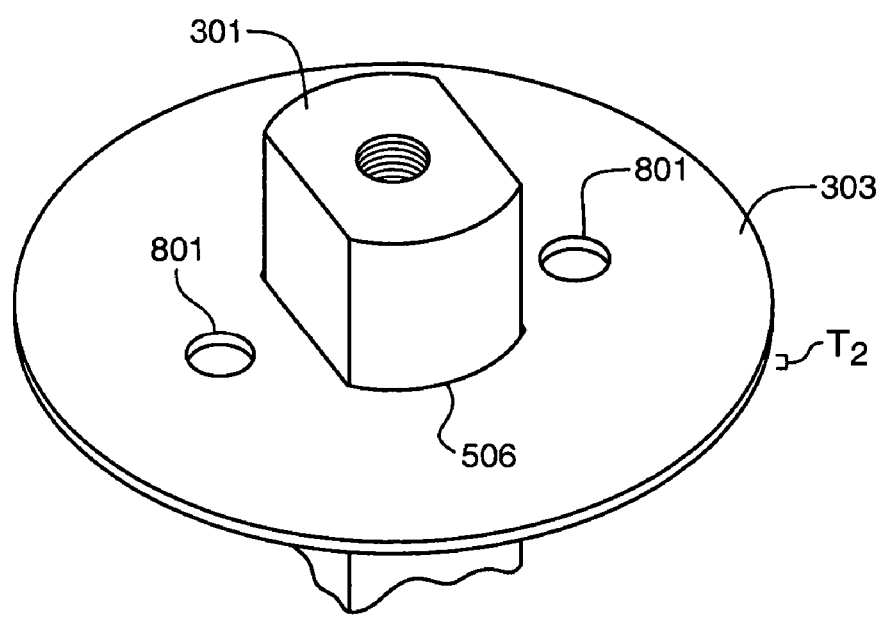
FIG. 8 shows an end plate according to an embodiment of the invention.

FIG. 8 shows an end plate 303 according to an embodiment of the invention. The end plate 303 can include an aperture 506 and one or more alignment apertures 801. The aperture 506 substantially conforms to a cross-sectional shape of the connection rod 301. In one embodiment, an effective diameter/size of the end plate 303 is larger than an effective diameter/size of the collection plates 302.

The end plate 303 in one embodiment comprises a collection plate 302 with the addition of the one or more alignment apertures 801. Alternatively, the end plate 303 can comprise a special plate, including the aperture 506 but with a different composition, a different thickness $T_2$, a different shape, etc.

Figure 9:
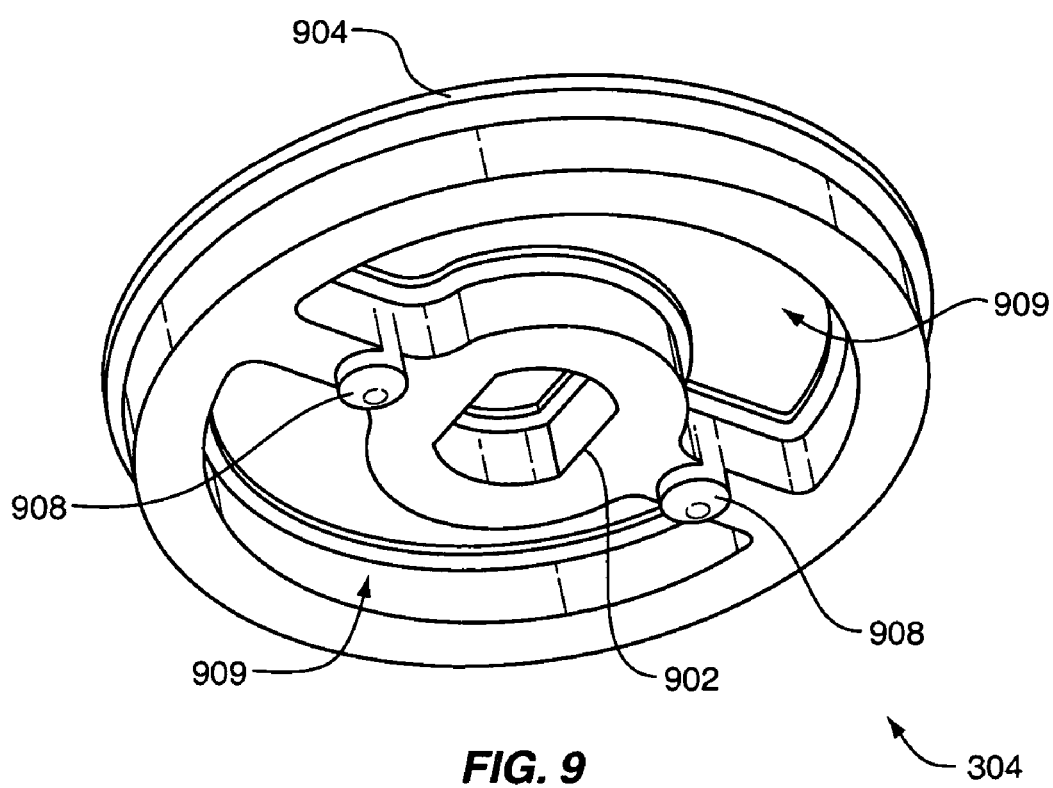
FIG. 9 shows an end cap according to an embodiment of the invention.

FIG. 9 shows the end cap 304 according to an embodiment of the invention. The end cap 304 includes an end cap aperture 902 that substantially conforms to the cross-sectional shape of the connection rod 301. In one embodiment the end cap 304 is substantially circular in shape. In one embodiment, the end cap 304 is larger than the collection plates 302, wherein the end caps 304 therefore function to protect the collection plates 302 from contact and damage.

The end cap 304 can optionally include cut-outs 909. The cut-outs 909 can decrease the mass of the end cap 304. In addition, the cut-outs 909 can offer an inspection capability to the electrostatic precipitator cell 300.

The end cap 304 can include one or more alignment projections 908 that engage corresponding alignment apertures 801 in an end plate 303 (see FIG. 8). The alignment projections 908 can comprise any shape, including substantially cylindrical, substantially rectangular, irregular, etc.

The end cap 304 can include a ridge 904. The ridge 904 can be larger than the collection plates 302, wherein the ridges 904 of the end caps 304 therefore protect the collection plates 302 from contact and damage.

Figure 10:
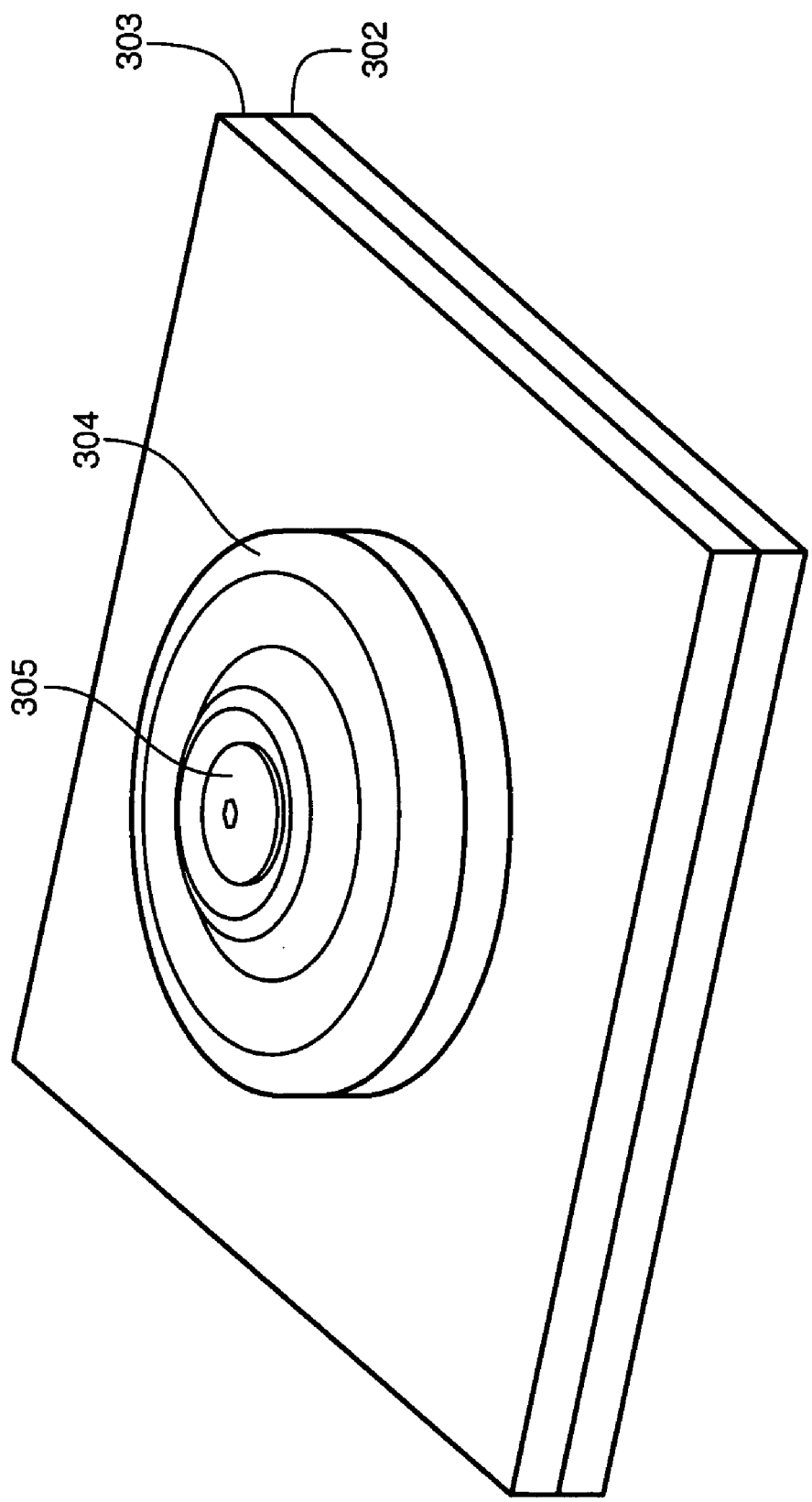
FIG. 10 shows a single collection plate, an end plate, an end cap, and a fastener assembled together.

FIG. 10 shows a single collection plate 302, an end plate 303, an end cap 304, and a fastener 305 assembled together. The fastener 305 will removably attach to a fastener aperture 403 of the connection rod 301. It can be seen from the figure that the shape of the collection plates 302 and the end plates 303 can be substantially similar, and can be rectangular in shape if desired. In addition, it should be noted that the collection plates 302 and the end plates 303 can be larger in size than the end cap 304.

Figure 11A:
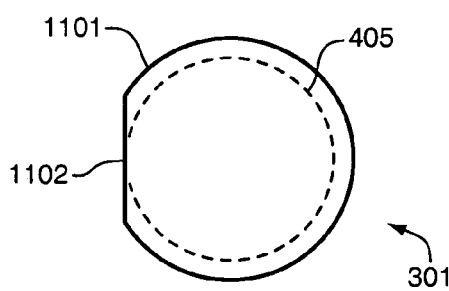
FIGS. 11A–11F show various possible cross-sectional shapes of the connection rod according to the invention.
Figure 11B:
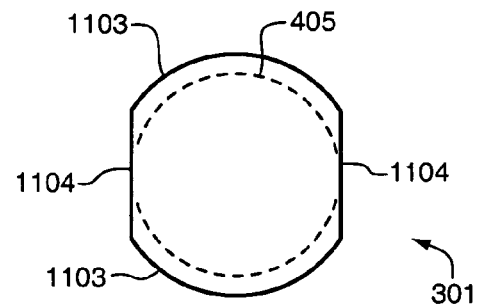
Figure 11C:
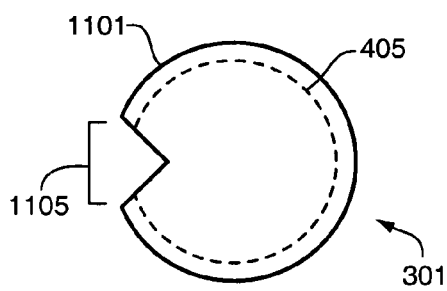
Figure 11D:
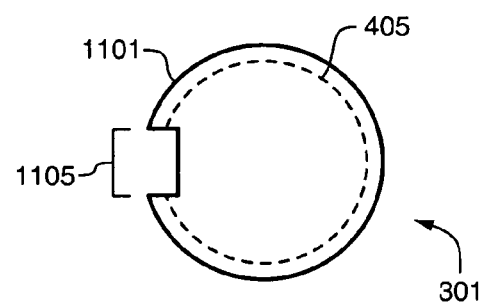
Figure 11E:
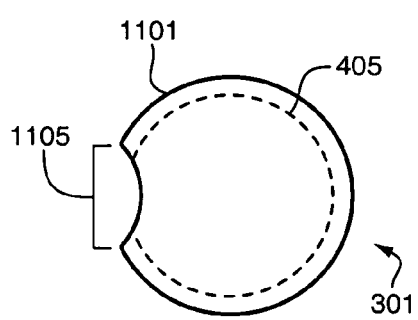
Figure 11F:
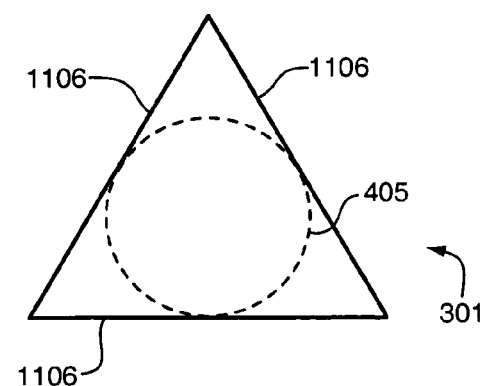

FIGS. 11A–11F show various possible cross-sectional shapes of the connection rod 301 according to the invention. FIG. 11A shows a substantially circular cross-sectional shape that includes one substantially curved lengthwise portion 1101 and a single planar lengthwise portion 1102. FIG. 11B shows a substantially circular cross-sectional shape that includes two substantially curved lengthwise portions 1103 and two substantially planar lengthwise portions 1104. The two curved portions do not have to be equal in size and curvature, and the two planar portions likewise do not have to be equal in size and planarity. FIGS. 11C–11E show a substantially circular cross-sectional shape that includes one substantially curved lengthwise portion 1101 and at least one lengthwise groove 1105. FIG. 11F shows a substantially triangular cross-sectional shape that includes a three planar lengthwise portions 1106.

Although most of the embodiments depicted in FIGS. 11A–11F are substantially circular in cross-sectional shape, the connection rod 301 is not limited to a circular cross-sectional shape. Other cross-sectional shapes are contemplated for the connection rod 301, and are included in the scope of the description and claims.

It should be noted that all embodiments include a plurality of circumferential grooves 405. In the embodiments shown, the circumferential grooves 405 are substantially circular. However, other groove configurations are contemplated and are included in the scope of the description and claims.

The air cleaner according the invention can be implemented according to any of the embodiments in order to obtain several advantages, if desired. The invention can provide an effective and efficient air cleaner device, such as a tower air cleaner, for example. The electrostatic precipitator cell can be easily and quickly assembled and disassembled. The electrostatic precipitator cell according to the invention can comprise multiple stackable collection plates. The electrostatic precipitator cell can be assembled with varying numbers of collection plates, and therefore can be easily and conveniently assembled for a particular application.

The invention insures proper and consistent spacing of the collection plates. The invention provides a low cost assembly method that results in substantially parallel collection plates in an assembled electrostatic precipitator cell.

The invention enables proper and efficient cleaning of an electrostatic ionizer. The electrostatic precipitator cell can be easily and quickly disassembled for cleaning, repair, or refurbishment.

What is claimed is:

1. An electrostatic precipitator cell, comprising:
   a connection rod including first and second ends, a length, a cross-sectional shape, and a lengthwise surface;
   a plurality of collection plates located in spaced-apart arrangement on the connection rod, with a collection plate of the plurality of collection plates including at least one aperture, with the at least one aperture substantially conforming to the cross-sectional shape of the connection rod;
   attachment means formed on the plurality of collection plates and adjacent to the at least one apertures, with the attachment means being configured to removably attach the plurality of collection plates to the connection rod, wherein the plurality of collection plates are held in a substantially parallel orientation on the connection rod by the attachment means.

2. The electrostatic precipitator cell of claim 1, with the connection rod further including a plurality of spaced-apart circumferential grooves fanned in the lengthwise surface of the connection rod and wherein the attachment means engage two or more circumferential grooves of the plurality of spaced-apart circumferential grooves.

3. The electrostatic precipitator cell of claim 1, with the connection rod further including a plurality of spaced-apart, substantially parallel circumferential grooves formed in the lengthwise surface of the connection rod and wherein the attachment means engage two or more circumferential grooves of the plurality of spaced-apart circumferential grooves.

4. The electrostatic precipitator cell of claim 1, with the connection rod further including a plurality of spaced-apart circumferential grooves formed in the lengthwise surface of the connection rod and wherein the attachment means engage two or more circumferential grooves of the plurality of spaced-apart circumferential grooves when the connection rod is rotated into cross-alignment in apertures of the plurality of collection plates.

5. The electrostatic precipitator cell of claim 1, with the collection plate including one or more alignment features located substantially on a circumferential edge.

6. The electrostatic precipitator cell of claim 1, with the at least one aperture comprising a substantially central aperture.

7. The electrostatic precipitator cell of claim 1, further comprising:
   the connection rod further including first and second fastener bores in the first and second ends;
   first and second end caps including end cap apertures that substantially conform to the cross-sectional shape of the connection rod;
   first and second fasteners configured to engage the first and second fastener bores of the connection rod;
   wherein the first and second end caps slide onto the connection rod and the first and second fasteners removably affix the first and second end caps to the connection rod.

8. The electrostatic precipitator cell of claim 6, further comprising:
   first and second end plates, with an end plate of the first and second end plates including an end plate aperture that substantially conforms to the cross-sectional shape of the connection rod and further including one or more alignment apertures formed in the first and second end plates;
   one or more alignment projections formed on the first and second end caps, with the one or more alignment projections corresponding to the one or more alignment apertures of the first and second end plates.

9. The electrostatic precipitator cell of claim 1, further comprising:
   the connection rod further including first and second fastener bores in the first and second ends;
   first and second end plates, with an end plate of the first and second end plates including an end plate aperture that substantially conforms to the cross-sectional shape of the connection rod and further including one or more alignment apertures formed in the first and second end plates;
   first and second end caps, with an end cap of the first and second end caps including an end cap aperture that substantially conforms to the cross-sectional shape of the connection rod and further including one or more alignment projections formed on the first and second end caps, with the one or more alignment projections corresponding to the one or more alignment apertures of the first and second end plates;
   first and second fasteners configured to engage the first and second fastener bores of the connection rod;
   wherein the first and second end plates comprise outermost plates on the connection rod, wherein the first and second end caps slide onto the connection rod, and wherein the first and second fasteners removably affix the first and second end caps to the connection rod.

10. The electrostatic precipitator cell of claim 1, with the attachment means comprising one or more spring members formed on a collection plate of the plurality of collection plates and formed adjacent to the aperture.

11. An electrostatic precipitator cell, comprising:
   a connection rod including first and second ends, a length, a cross-sectional shape, and a lengthwise surface, with the connection rod including a plurality of spaced-apart circumferential grooves formed in the lengthwise surface of the connection rod;

a plurality of collection plates, with a collection plate of the plurality of collection plates comprising a substantially planar plate including a predetermined thickness and at least one aperture, with the at least one aperture substantially conforming to the cross-sectional shape of the connection rod, with the collection plate including one or more spring members formed adjacent to the aperture so that when the collection plate is assembled onto the connection rod the one or more spring members engage a groove of the plurality of spaced-apart circumferential grooves when the connection rod is rotated with respect to the plurality of collection plates, and wherein the groove locates and removably retains the collection plate on the connection rod and wherein the plurality of collection plates are held in a substantially parallel orientation in the plurality of grooves of the connection rod.

12. The electrostatic precipitator cell of claim 11, with the collection plate including one or more alignment features located substantially on a circumferential edge.

13. The electrostatic precipitator cell of claim 11, with the lengthwise surface of the connection rod being formed with at least one substantially curved lengthwise portion and at least one substantially planar lengthwise portion.

14. The electrostatic precipitator cell of claim 11, with the lengthwise surface of the connection rod being formed with at least one substantially curved lengthwise portion and at least one lengthwise groove.

15. The electrostatic precipitator cell of claim 11, with the lengthwise surface of the connection rod being formed with two substantially curved lengthwise portions and two substantially lengthwise planar portions.

16. The electrostatic precipitator cell of claim 11, with the lengthwise surface of the connection rod being formed with a plurality of substantially lengthwise planar portions.

17. The electrostatic precipitator cell of claim 11, with the at least one aperture comprising a substantially central aperture.

18. The electrostatic precipitator cell of claim 11, further comprising:
the connection rod further including first and second fastener bores in the first and second ends;
first and second end caps including end cap apertures that substantially conform to the cross-sectional shape of the connection rod;
first and second fasteners configured to engage the first and second fastener bores of the connection rod;
wherein the first and second end caps slide onto the connection rod and the first and second fasteners removably affix the first and second end caps to the connection rod.

19. The electrostatic precipitator cell of claim 18, with the first and second fastener bores comprising threaded bores and with the first and second fasteners comprising corresponding threaded fasteners.

20. The electrostatic precipitator cell of claim 18, with an effective diameter of the first and second end plates being larger than a collection plate effective diameter.

21. The electrostatic precipitator cell of claim 18, further comprising:
first and second end plates, with an end plate of the first and second end plates including an end plate aperture that substantially conforms to the cross-sectional shape of the connection rod and further including one or more alignment apertures formed in the first and second end plates;
one or more alignment projections formed on the first and second end caps, with the one or more alignment projections corresponding to the one or more alignment apertures of the first and second end plates.

22. A method of forming an electrostatic precipitator cell, comprising:
providing a connection rod and a plurality of collection plates including a corresponding plurality of apertures, with an aperture substantially conforming to a cross-sectional shape of the connection rod;
inserting the connection rod into the plurality of apertures; and
engaging one or more attachment devices between the connection rod and a collection plate of the plurality of collection plates, with the one or more attachment devices being formed on the plurality of collection plates and adjacent to the plurality of apertures, wherein the one or more attachment devices removably attach the collection plate to the connection rod and wherein the plurality of collection plates are removably attached to the connection rod in a spaced-apart, substantially parallel relation.

23. The method of claim 22, with the providing the plurality of collection plates thither comprising providing the plurality of collection plates in a substantially coaxial, substantially parallel orientation, wherein the plurality of apertures are substantially aligned.

24. The method of claim 22, with the providing the plurality of collection plates further comprising placing the plurality of collection plates into an assembly structure, wherein the plurality of collection plates are held in a substantially coaxial, substantially parallel orientation and wherein the plurality of apertures are substantially aligned.

25. The method of claim 22, with each collection plate of the plurality of collection plates including one or more alignment features located substantially on a circumferential edge, and with the providing further comprising placing the plurality of collection plates into an assembly structure, wherein the one or more alignment features of said each collection plate is adapted to engage an alignment device of the assembly structure, and wherein the plurality of collection plates are held in a substantially coaxial, substantially parallel orientation and wherein the plurality of apertures are substantially aligned.

26. The method of claim 22, with the connection rod including a plurality of spaced-apart circumferential grooves corresponding to the plurality of collection plates, wherein the one or more attachment devices of the collection plate engages a circumferential groove.

27. The method of claim 22, with the connection rod including a plurality of spaced-apart, substantially parallel circumferential grooves corresponding to the plurality of collection plates, wherein the one or mare attachment devices of the collection plate engages a circumferential groove.

28. The method of claim 22, with the connection rod including a plurality of spaced apart-circumferential grooves and with the engaging further comprising rotating the connection rod at least partially in the plurality of collection plates and into cross-alignment in the plurality of apertures of the plurality of collection plates, wherein the one or more attachment devices of the collection plate engages a corresponding circumferential groove.

29. The method of claim 22, further comprising:
engaging first and second end caps on first and second ends of the connection rod; and
engaging first and second fasteners with first and second fastener bores in the first and second ends.

30. The method of claim 22, further comprising:
providing first and second end plates, with an end plate of the first and second end plates including an end plate aperture that substantially conforms to the cross-sectional shape of the connection rod and further including one or more alignment apertures formed in the first and second end plates;
engaging first and second end caps on first and second ends of the connection rod, with the first and second end caps including an end plate aperture that substantially conforms to the cross-sectional shape of the connection rod and further including one or more alignment projections, with the one or more alignment projections corresponding to the one or more alignment apertures of the first and second end plates;
engaging first and second fasteners with first and second fastener bores in the first and second ends.

31. The method of claim 22, further comprising:
providing first arid second fastener bores in first and second ends of the connection rod;
providing first and second end plates as outer plates of the plurality of collection plates, with an end plate of the first and second end plates including an end plate aperture that substantially conforms to the cross-sectional shape of the connection rod and further including one or more alignment apertures formed in the first and second end plates;
engaging first and second end caps on the connection rod and outside the first and second end plates, with an end cap of the first and second end caps including an end cap aperture that substantially conforms to the cross-sectional shape of the connection rod and further including one or more alignment projections formed on the first and second end caps, with the one or more alignment projections corresponding to the one or more alignment apertures of the first and second end plates; and
engaging first and second fasteners with the first and second fastener bores of the connection rod in order to removably affix the first and second end caps to the connection rod.

32. The method of claim 22, with the attachment devices comprising one or more spring members formed on a collection plate of the plurality of collection plates and formed adjacent to the aperture.

* * * * *